United States Patent

[11] 3,600,544

[72] Inventor Colin Francis Greening Smith
Hants, England
[21] Appl. No. 558,900
[22] Filed June 20, 1966
[45] Patented Aug. 17, 1971
[73] Assignee International Standard Electric Corporation
New York, N.Y.
[32] Priority June 25, 1965
[33] Great Britain
[31] 26996/65

[54] CABLE SHEATH SEAM WELDING
4 Claims, 2 Drawing Figs.
[52] U.S. Cl. .................................................. 219/61,
219/130, 219/137
[51] Int. Cl. ................................................. B23k 9/02
[50] Field of Search .......................................... 219/60, 61,
64, 67, 124, 137, 147

[56] References Cited
UNITED STATES PATENTS
1,512,787  10/1924  Morton .......................... 219/137
1,616,145  2/1927   Shipman ....................... 219/147 X
2,682,598  6/1954   Macoy .......................... 219/61
2,957,977  10/1960  Sullivan ........................ 219/137 X
3,226,522  12/1965  Duddridge et al. ........... 219/60

Primary Examiner—J. V. Truhe
Assistant Examiner—J. G. Smith
Attorneys—C. Cornell Remsen, Jr., Rayson P. Morris, Percy P. Lantz, Philip M. Bolton and Isidore Togut ABSTRACT: A seam-welding method for metal tubes displaces the welding electrode from a normal position with respect to the tube to a position over an auxiliary electrode. Current is initiated between the welding electrode and auxiliary electrode which is removed and the current increased, with the welding electrode being returned to the normal position.

PATENTED AUG 17 1971
3,600,544
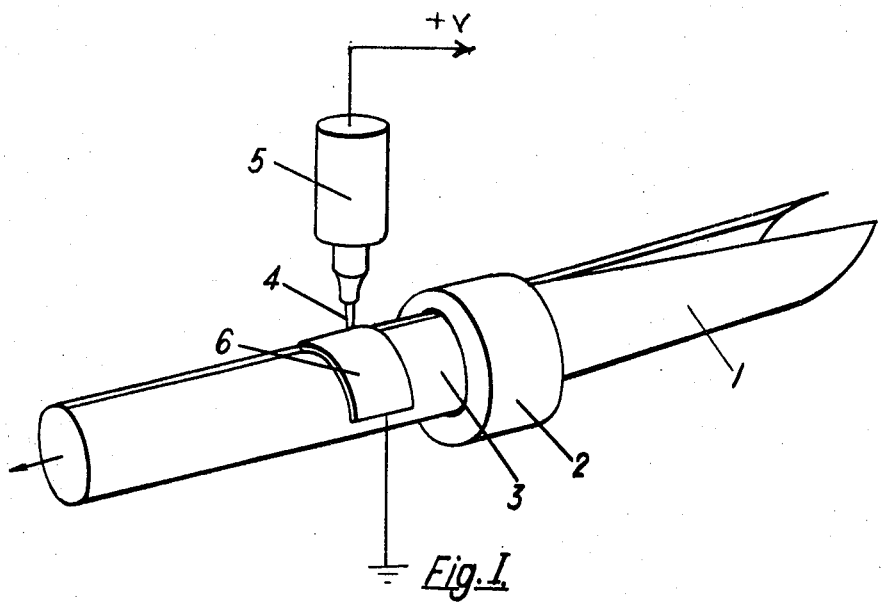
Fig. I.
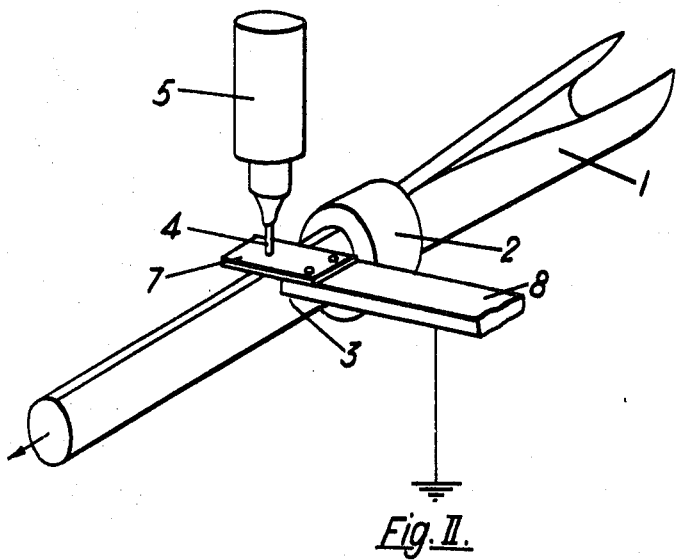
Fig. II.
Inventor
COLIN F. G. SMITH
By Philip M. Bolton
Attorney

CABLE SHEATH SEAM WELDING

This invention relates to a method and apparatus for seam welding a metal tube formed from a folded strip.

In the manufacture of electric cables, metal sheaths are formed round the cable core by progressively folding a metal strip either longitudinally or helically round the cable core to form a metal tube, then seam welding the edges of the metal strip together. Normally welding is carried out by moving the metal tube past an arc welding electrode, and weld faults are liable to occur using this method if it is necessary to stop and restart the apparatus. These weld faults mainly occur owing to difficulties in the control at low welding currents of a welding current source with a wide current range; either a surge current may occur when the weld current is switched on, so that a hole is burnt through the metal tube, or welding current may not be established at the same time as welding is restarted, so that an unwelded portion occurs in the seam. The weld faults could be avoided by striking the welding arc at a low current, in one particular example of about 5 amperes, which would be insufficient to burn the tube. However, available power sources which are also capable of supplying the required maximum current for this example, have a minimum controllable current in the region of 20 amperes.

According to the present invention there is provided a method of seam welding a metal tube formed from a folded strip, said method including a starting operation which comprises the steps of causing a predetermined relative displacement in a first direction parallel to the edges of the folded strip to occur between the tube and an arc welding electrode, interposing an auxiliary electrode of a material of relatively high thermal conductivity between said tube and said welding electrode, initiating a flow of current between said welding electrode and said auxiliary electrode, removing said auxiliary electrode from between said tube and said welding electrode on initiating relative movement in a direction opposite to said first direction between said tube and said welding electrode, increasing said current to a value suitable for causing the seam of said tube to be welded, and causing a second displacement equal and opposite to said predetermined displacement.

According to the present invention there is further provided apparatus for seam welding a metal tube formed from a folded strip, which comprises means for causing relative movement in one direction parallel to the edges of the folded strip between the tube and an arc welding electrode, means for causing a predetermined relative displacement in a direction opposite to said one direction to occur between the tube and the welding electrode, means for inserting an auxiliary electrode of a material of relatively high thermal conductivity between said tube and said welding electrode, means for initiating a flow of current between the welding electrode and the auxiliary electrode, means for removing the auxiliary electrode from between the tube and the welding electrode on initiating relative movement in said one direction, means for increasing said current to a value suitable for causing the seam of said tube to be welded, and means for causing a second displacement equal and opposite to said first displacement.

The invention will now be described with reference to FIGS. 1 and 2 of the accompanying drawing, each of which shows an embodiment of the invention for seam welding a cable sheath.

Referring to FIG. 1 of the drawing, metal strip 1 is formed into a sheath round a cable core by passing the metal strip and the cable core in the direction indicated by the arrow through a number of rolls or dies which progressively fold the strip to form a metal tube 3 round the core. For simplicity the cable core has not been indicated, and only the final die 2 which completes the folding of the metal strip has been shown. The metal tube then passes an electrode 4 of an arc welding torch 5 which is normally held stationary in a welding position close to the final die. If it is necessary to interrupt welding, then before welding is restarted the welding torch is moved through a short distance, e.g., about one inch, in the same direction as the tube was moving to a forward position in which the electrode of the welding torch is opposite an already welded portion of the tube. A U-shaped member 6 of material having relatively high thermal and electrical conductivity, e.g., copper, and a thickness sufficient for it to be able to withstand a current of about 20 amperes, which is the minimum controllable current of standard wide range power sources, is then mounted astride the tube opposite the welding electrode. Hence the member provides an auxiliary electrode for the welding torch, and when welding is restarted a flow of current at the minimum controllable value is first established between the welding electrode and the auxiliary electrode. Movement of the metal tube is then started, and the auxiliary electrode is carried away from between the tube and the torch so that the arc is transferred to an already welded portion of the tube. As the arc traverses the already welded portion, the current is increased to a suitable welding value and the welding torch is returned to its normal welding position.

The method of operation of the embodiment shown in FIG. 2 of the drawing is similar to that described with reference to FIG. 1 but in this case the auxiliary electrode comprises a flat copper member 7 which is attached to an earthed armature 8 of a solenoid (not shown). When welding is interrupted the auxiliary electrode is interposed between the metal tube and the welding torch in its forward position by energizing the solenoid so that the armature moves towards the tube in a lateral direction. After an arc has been struck between the auxiliary electrode and the welding electrode, the auxiliary electrode is removed at the same time as restarting movement of the metal tube by deenergizing the solenoid so that the armature moves away from the tube. The solenoid is preferably deenergized by operation of the start button controlling the movement of the metal tube so that the auxiliary electrode is removed automatically when the metal tube starts moving. In this case the solenoid is preferably controlled from the start circuit through a suitable delay circuit, since owing to inertia the tube does not move immediately when the start button is operated. Energization of the solenoid may also be controlled from the stop button controlling the movement of the metal tube, so that the auxiliary electrode is automatically interposed when welding is stopped.

The embodiment of FIG. 2 can, of course, be modified so that the auxiliary electrode is moved parallel to the axis of the tube, or in any plane not including the welding torch and the tube.

In another embodiment In another embodiment an auxiliary electrode comprising an earthed copper member similar to the member shown in FIG. 2 is pivotally mounted on an axis perpendicular to a plane not including the metal tube and the welding torch, and the auxiliary electrode is interposed and removed from between the welding torch and the metal tube by rotating it about the pivot.

The auxiliary electrode in any of the embodiments can also be used to advantage for establishing a welding arc when welding is first started. However, since the auxiliary electrode is interposed at the forward position of the welding torch, which is preferably close to the final die, care must be taken that the edges of the metal strip meet beneath the welding electrode. In the first embodiment, since the U-shaped auxiliary electrode is interposed manually and its removal is effected by movement of the tube, it can be interposed at the normal welding position of the torch before commencement of welding, this position being closer to the final die so that the edges will not be inclined to splay out beneath the welding electrode.

The invention is also applicable, with suitable modifications of the manner of moving the auxiliary electrode, to methods in which the metal strip is folded helically round a cable core.

It is to be understood that the foregoing description of specific examples of this invention is not to be considered as a limitation on its scope.

What I claim is:

1. A method of seam welding a metal tube formed from a folded strip, said method including a starting operation which comprises the steps of moving a welding electrode opposite an already welded portion while the tube is stationary a predetermined relative displacement from a normal welding position in a first direction parallel to the edges of the folded strip, interposing an auxiliary electrode of a material of relatively high thermal conductivity between said tube and said welding electrode at the displaced position, then initiating a flow of current between said welding electrode and said auxiliary electrode, removing said auxiliary electrode on initiating relative movement in a direction opposite to said first direction between said tube and said welding electrode, increasing said current and initiating flow thereof between said welding electrode and tube to a value suitable for causing the seam of said tube to be welded and causing a second displacement to return said welding electrode to said normal position, said movement of said tube past said welding electrode being continued to weld said seam.

2. A method of seam welding a metal tube formed from a folded strip, said method including a starting operation which comprises the steps of causing a predetermined relative displacement from a normal welding position in a first direction parallel to the edges of the folded strip to occur between the tube and an arc welding electrode, interposing an auxiliary electrode of a material of relatively high thermal conductivity between said tube and said welding electrode at the displaced position, then initiating a flow of current between said welding electrode and said auxiliary electrode, removing said auxiliary electrode in a plane not including the tube or the welding electrode from between said tube and said welding electrode on initiating relative movement in a direction opposite to said first direction between said tube and said welding electrode, increasing said current and initiating flow thereof between said welding electrode and tube to a value suitable for causing the seam of said tube to be welded and causing a second displacement equal and opposite to said predetermined displacement to return said welding electrode to said normal position, said movement of said tube past said welding electrode being continued to weld said seam.

3. Apparatus for seam welding a metal tube formed from a folded strip which comprises means for folding said strip, an arc welding electrode mounted adjacent the edges of the folded strip, said tube having a normal movement relative to said folding means and electrode in one direction parallel to the edges of the folded strip and adapted to have a predetermined displacement from a normal welding position in a direction opposite to said one direction, an auxiliary electrode having a flat portion interposed between the tube and the welding electrode and including means for removing the auxiliary electrode in a plane not including the tube or the welding electrode, the auxiliary electrode being made of a material of relatively high thermal conductivity, means applying a potential between the welding electrode and the auxiliary electrode and tube, the auxiliary electrode being removable from between the tube and the welding electrode on initiating relative movement in said one direction, said welding electrode being returned to said normal position upon application of sufficient potential suitable for welding.

4. Apparatus as claimed in claim 3, wherein said means for removing the auxiliary electrode is an armature mechanically coupled thereto.